(12) United States Patent
Kanas et al.

(10) Patent No.: US 12,386,394 B2
(45) Date of Patent: Aug. 12, 2025

(54) FLEXIBLE DISPLAY PANELS

(71) Applicant: Hewlett-Packard Development Company, L.P., Spring, TX (US)

(72) Inventors: Derek Kyle Joseph Kanas, Spring, TX (US); Andre Da Fonte Lopes Da Silva, Palo Alto, CA (US); Christopher Steven, Spring, TX (US); Guoxing Yang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 102 days.

(21) Appl. No.: 18/561,073

(22) PCT Filed: Jul. 30, 2021

(86) PCT No.: PCT/US2021/043951
§ 371 (c)(1),
(2) Date: Nov. 15, 2023

(87) PCT Pub. No.: WO2023/009140
PCT Pub. Date: Feb. 2, 2023

(65) Prior Publication Data
US 2024/0255997 A1 Aug. 1, 2024

(51) Int. Cl.
*G06F 1/16* (2006.01)
(52) U.S. Cl.
CPC .......... *G06F 1/1652* (2013.01); *G06F 1/1679* (2013.01)
(58) Field of Classification Search
CPC combination set(s) only.
See application file for complete search history.

(56) References Cited

U.S. PATENT DOCUMENTS

| | | | |
|---|---|---|---|
| 5,668,570 A | 9/1997 | Ditzik | |
| 6,222,507 B1 * | 4/2001 | Gouko | G06F 1/1647 361/679.04 |
| 6,353,529 B1 | 3/2002 | Cies | |
| 6,430,038 B1 * | 8/2002 | Helot | G06F 1/1632 248/920 |
| 6,842,338 B2 * | 1/2005 | Iredale | G06F 1/1616 361/740 |
| 6,859,219 B1 * | 2/2005 | Sall | G06F 1/1683 345/905 |
| 7,057,888 B2 * | 6/2006 | Oakley | G06F 1/1686 D14/317 |
| 7,375,954 B2 * | 5/2008 | Yang | G06F 1/1622 248/920 |
| 7,440,265 B2 * | 10/2008 | Ou Yang | G06F 1/1652 455/575.4 |

(Continued)

FOREIGN PATENT DOCUMENTS

| | | |
|---|---|---|
| CN | 111699458 A | 9/2020 |
| KR | 10-1844796 B1 | 4/2018 |

*Primary Examiner* — Lisa Lea-Edmonds
(74) *Attorney, Agent, or Firm* — Quarles & Brady LLP

(57) ABSTRACT

According to an example, a computing device comprises a base portion and a lid portion rotatably coupled to the base portion. The lid portion comprises a platform, an aperture to receive the platform, and a flexible display panel disposed on the platform. Upon a deployment of the platform, an area of the flexible display panel on an upper side of lid portion is to increase such that the area overlaps with the base portion.

15 Claims, 8 Drawing Sheets

(56) References Cited

U.S. PATENT DOCUMENTS

| | | | |
|---|---|---|---|
| 7,459,634 B2* | 12/2008 | Martin | G06F 1/1603 |
| | | | 248/920 |
| 9,092,189 B2* | 7/2015 | Doczy | G06F 1/1616 |
| 9,504,170 B2 | 11/2016 | Rothkopf et al. | |
| 10,082,832 B1* | 9/2018 | Wang | G06F 1/1681 |
| 10,606,318 B1* | 3/2020 | Lin | G06F 1/1681 |
| 10,820,433 B2* | 10/2020 | Cha | H05K 5/0226 |
| 10,890,948 B1* | 1/2021 | Chueh | G06F 1/1624 |
| 10,936,017 B1 | 3/2021 | Choi et al. | |
| 11,023,015 B1* | 6/2021 | Wen | G06F 1/1679 |
| 11,209,869 B2* | 12/2021 | Hudgins | G06F 1/1681 |
| 11,307,612 B2* | 4/2022 | Hosokai | G06F 1/1652 |
| 11,487,331 B2* | 11/2022 | Wen | G06F 1/1616 |
| 11,602,063 B2* | 3/2023 | Wen | G06F 1/1624 |
| 2006/0082518 A1* | 4/2006 | Ram | G06F 1/1675 |
| | | | 345/1.1 |
| 2006/0166713 A1* | 7/2006 | Yeh | G06F 1/1626 |
| | | | 455/575.1 |
| 2007/0146243 A1* | 6/2007 | Ou Yang | G06F 1/1601 |
| | | | 345/76 |
| 2013/0002114 A1 | 1/2013 | Hamers et al. | |
| 2014/0328041 A1 | 11/2014 | Rothkopf et al. | |
| 2015/0366089 A1 | 12/2015 | Park et al. | |
| 2017/0060188 A1 | 3/2017 | Han et al. | |
| 2018/0108330 A1* | 4/2018 | Wallace | G06F 1/1652 |
| 2019/0011955 A1 | 1/2019 | Stewart et al. | |
| 2020/0033911 A1 | 1/2020 | Moser | |
| 2022/0210930 A1* | 6/2022 | Wen | G06F 1/1626 |
| 2024/0255997 A1* | 8/2024 | Kanas | G06F 1/1624 |

\* cited by examiner

FLEXIBLE DISPLAY PANELS

BACKGROUND

Electronic devices such as computing devices may comprise flexible display panels to display image contents. A flexible display panel may be bent, rolled, or curved without damaging the integrity of the computing device. Flexible display panels may be based on flexible substrates such as plastic, metal, or flexible glass.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1A:
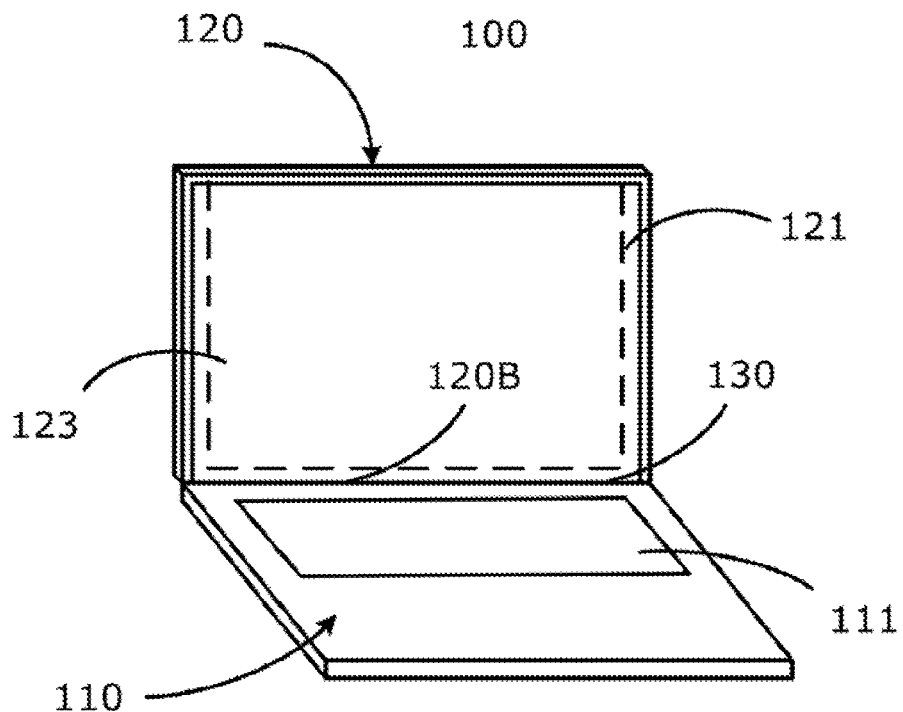
FIG. 1A shows a detailed view of a computing device including a platform in a retracted position, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to.

Electronic devices such as computing devices may use flexible display panels to display image content. Such flexible display panels comprise a plurality of pixels formed on a thin and flexible substrate, where the flexible substrate comprises materials such as plastic, metal, or flexible glass. In this fashion, even when the flexible display panel may be bent, folded, or rolled up, the flexible display panel will be capable of displaying the desired image content without suffering any damage. Examples of such flexible display panels include flexible liquid crystal display panels, flexible plasma display panels, flexible e-ink display panels, flexible organic light-emitting diode panels, flexible electro-wetting display panels, among others.

In order to transmit the image content to the flexible display panel, computing devices may send data associated with the image content to a controller operatively connected to the flexible display panel. When having a flexible touch display panel, the controller may issue a signal associated with a contact on a location of the flexible touch display panel.

Among the alternative uses available for a flexible display panel, a computing device may include the flexible display panel in order to enable multiple display sizes at the discretion of the user. Therefore, the same computing device may have a range of display sizes instead of a screen with fixed screen size. To re-size an effective display panel size, the computing device may have to perform some retraction and deployment operations in order to increase/decrease the effective display panel size on which image content is to be displayed. In some examples, some of these operations may imply using additional tools to remove some fixed elements in order to re-size the flexible display panel. For instance, when the computing device is a laptop comprising a lid portion rotatably coupled to a base portion, the flexible display panel configuration may be fixed via a series of screws. In order to expand/reduce the effective display panel size, a user may have to use tools to remove the screws, then, the user may have to set the desired effective display panel size, and then, put the screws back on the lid portion to ensure that the integrity of the computing device is not affected by the re-sizing process.

Throughout the present disclosure, the term "effective display panel size" will be used to refer to a portion of the flexible display panel on which an image content will be displayed for a user, i.e., the flexible display panel dimensions on which users will see the image content.

Disclosed herein are examples of computing devices and methods to modify an effective display panel size without using additional tools. Hence, different examples of computing devices, and methods are described.

Referring now to FIG. 1A, a computing device 100 comprising a platform 121 in a retracted position is shown. The computing device 100 comprises a lid portion 120 rotatably coupled to a base portion 110 via a hinge 130. The lid portion 110 comprises a flexible display panel 123 disposed on a platform 121 (represented in dashed lines). The hinge 130 enables a rotation of the lid portion 120 with respect to the base portion 110 of the computing device 100, where the base portion 110 comprises a keyboard 111 on an upper surface.

In FIG. 1A, the platform 121 is in a retracted position within an aperture of the lid portion 120 and the flexible display panel 123 is disposed on the platform 121. In the retracted position, the platform 121 does not extend away from a bottom side 120B of the lid portion 120, and therefore, the platform 121 is in the lid portion 120.

As previously explained, flexible display panels may be used to enable a range of effective display panel sizes without using additional tools. In FIG. 1A, the flexible display panel 123 covers the platform 121 of the lid portion 120 such that, if the platform 121 is deployed from the lid portion 120 through the aperture on the bottom side 120B of the lid portion 120, an area of flexible display panel 123 on an upper side of the lid portion 120 is to increase.

Figure 1B:
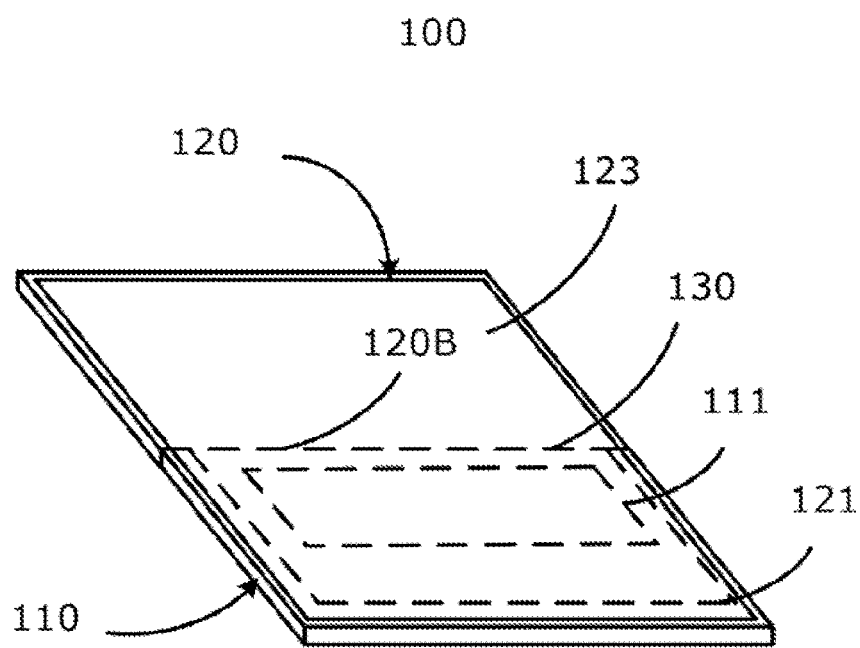
FIG. 1B shows a detailed view of the computing device of FIG. 1A with the platform in a deployed position.

Referring now to FIG. 1B, the computing device 100 of FIG. 1A with the platform 121 in a deployed position is shown. In the deployed position, the platform 121 of the computing device 100 fully extends from the bottom side 120B of the lid portion 120. As a result of the deployment in the transversal direction, the flexible display panel 123 extends over the base portion 110 such that the base portion 110 and the flexible display panel 123 overlap. In other examples, the aperture may be positioned at a different position instead of the bottom side 120B of the lid portion 120. In an example, the aperture may be provided on a top side of the lid portion 120.

In order to deploy the platform 121 of the computing device 100, an upper surface of the lid portion 120 and an upper surface of the base portion 110 are positioned at an angle equal to 180 degrees or greater than 180 degrees. In the deployed position, the platform 121 and the flexible display panel 123 cover the keyboard 111 of the base portion 110. However, when having the aperture of the lid portion 120 on a different side of the lid portion 120, the platform 121 may deploy in a different direction instead of the transversal direction towards the base portion 110. In an example, when the aperture is on the top side of the lid portion 120, the platform 121 may deploy in a transversal direction away from the base portion 110.

Throughout the description, the term "retracted position" will be used to refer to a position of the platform in which the platform is fully contained in the lid portion of the computing device. In addition, the term "deployed position" will be used to refer to a position of the platform in which the platform fully extends away from the aperture of the lid portion.

Figure 2A:
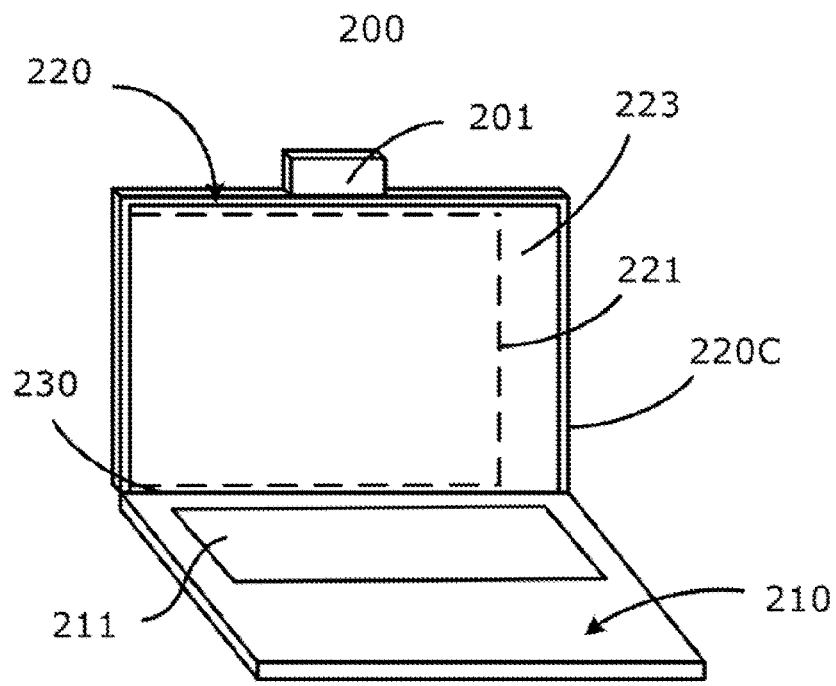
FIG. 2A shows a detailed view of a computing device with a platform movable in a longitudinal direction, according to an example of the present disclosure.

Referring now to FIG. 2A, a computing device 200 having a platform 221 movable in a longitudinal direction is shown. The computing device 200 comprises a lid portion 220 rotatably attached to a base portion 210 of the computing device 200 via a hinge 230. The lid portion 220 comprises a flexible display panel 223 disposed on a platform 221 (represented in dashed lines). As previously explained in reference to FIGS. 1A and 1B, the platform 221 is movable within an aperture of the lid portion 220. In FIG. 2A, the aperture is provided on a lateral side 220C of the lid and the platform 121 is in a retracted position. In the retracted position, the platform 221 does not protrude from the lateral side 220C of the lid portion 220 of the computing device 200.

In the computing device 200, the lid portion 220 further comprises a removable peripheral 201 attached on a top side of the lid portion 220. Due to the peripheral 201 can be removed, users may remove the peripheral 201 and re-locate it in alternative locations. In an example, the peripheral 201 may be a webcam. In other examples, the peripheral 201 may be a speaker or a microphone.

Due to the aperture of the lid portion 220 of the computing device 200 is on a lateral side 220C of the lid portion 220 instead of the bottom side of the lid portion 220 (bottom side 120B in FIGS. 1A and 1B), a deployment of the platform 221 will result in a movement parallel to a rotation axis defined by the hinge 230. Therefore, although the lid portion 220 and the base portion 210 may be at an angle lower than 180 degrees, the deployment of the platform 221 will not result in a contact between the base portion 210 and the platform 221.

Figure 2B:
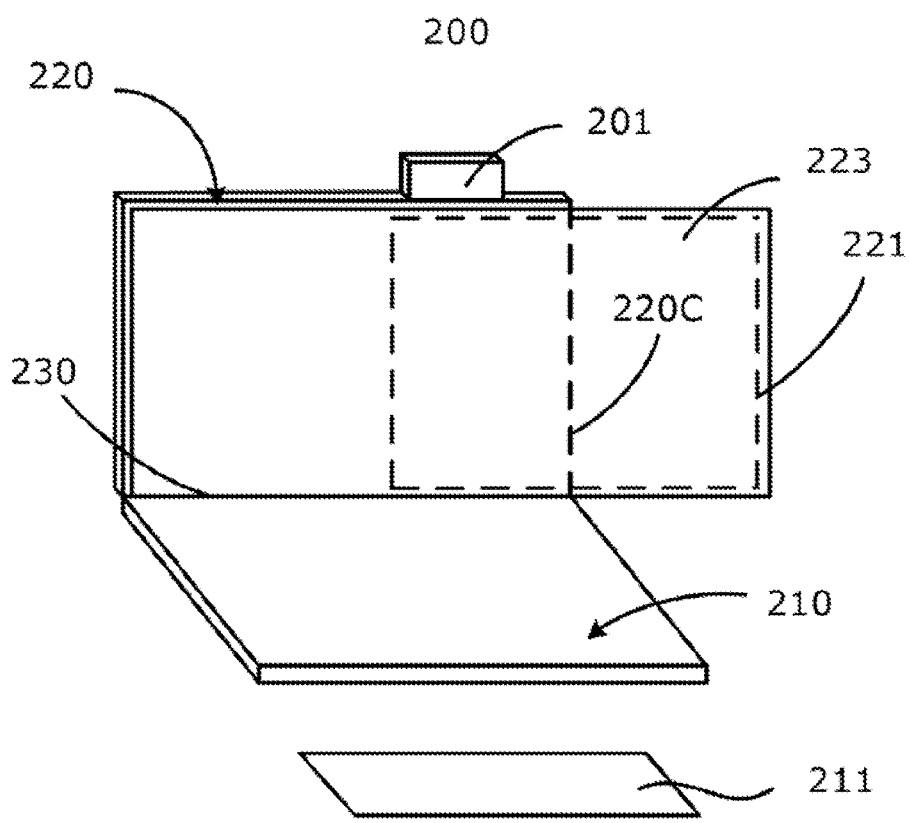
FIG. 2B shows a detailed view of the computing device of FIG. 2A upon deploying of the platform.

Referring now to FIG. 2B, the computing device 200 upon a deployment of the platform 221 is shown. Due to the aperture is provided on the lateral side 220C of the lid portion 220, the deployment is performed in a longitudinal direction. In the computing device 200 of FIG. 2B, the platform 221 does not fully protrude from the aperture of the lid portion 220. Instead, the platform 221 partially protrudes from the aperture of the lid portion 220. Hence, the position of the platform corresponds with an intermediate position between the retracted position (shown in FIG. 2A) and the deployed position (in which the platform 221 fully protrudes from the aperture).

In FIG. 2B, an area of the flexible display panel 223 on the upper side of the lid portion 220 is greater than the area of flexible display panel 223 on the upper side of the lid portion before the deployment. In other words, the effective display panel size of the computing device 200 of FIG. 2B is greater than the effective display panel size of the computing 200 of FIG. 2A.

As previously explained, the peripheral 201 can be positioned at different locations. In FIG. 2B, the peripheral 201 has been moved to remain centered with respect to the effective display panel size of the computing device 200. Similarly, the keyboard 211 has been removed from the base portion 210 to be used separately in order to enhance the user experience.

Figure 3A:
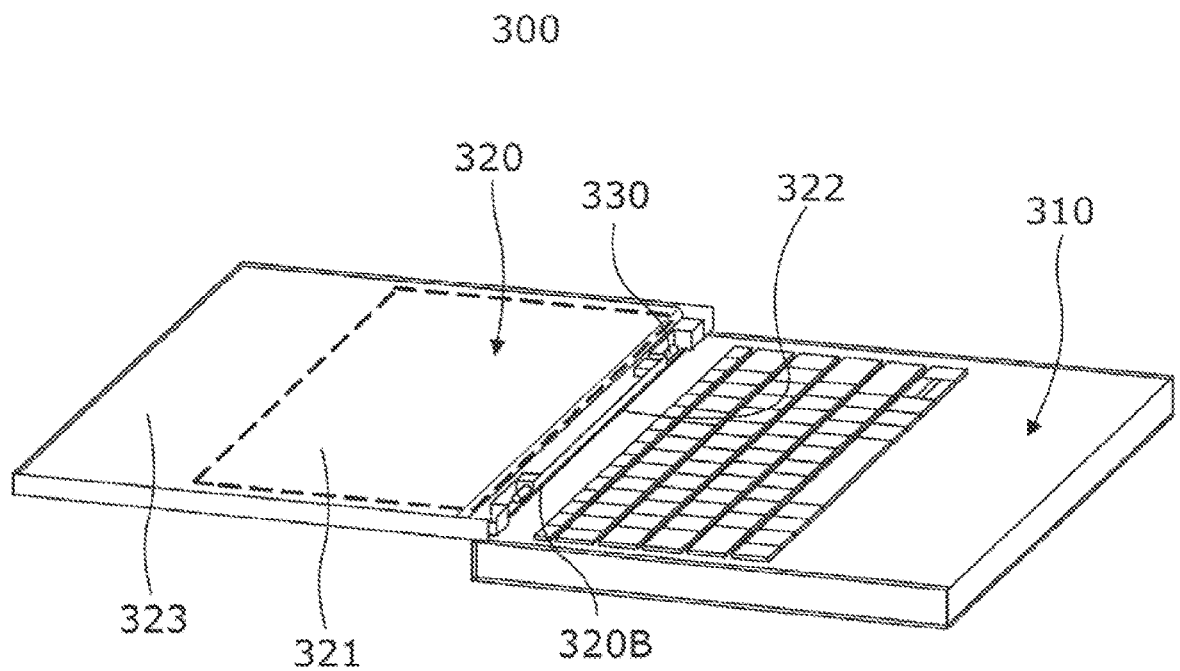
FIG. 3A shows a detailed view of a computing device comprising a lid portion including a flexible display panel, according to an example of the present disclosure.

Referring now to FIG. 3A, a detailed view of a computing device 300 comprising a lid portion 320 rotatably coupled to a base portion 310 via a hinge 330 is shown. The base portion 310 includes a keyboard. In an example, the keyboard may be removable. In other examples, the base portion 310 may include additional elements such as a touchpad.

The lid portion 320 of the computing device 300 comprises a platform 321 (represented in dashed lines in FIG. 3A) in a retracted position, an aperture 322 to receive the platform 321 on a bottom side 320B of the lid portion 320, and a flexible display panel 323 disposed on the platform 321. In the example of FIG. 3A, an upper side of the platform 321 is covered by the flexible display panel 323 such that the effective display panel size corresponds with an area on an upper side of the lid portion 320. To enable a range of effective display panel sizes, the flexible display panel 323 also covers a lower side of the platform 321 such that a movement of the platform 321 from the retracted position towards a deployed position results in a modification of the effective display panel size. In FIG. 3A, the flexible display panel 323 is bent around an edge of the platform 321 located next to the hinge 130. Thus, a movement of the platform 321 away from the lid portion 320 will result in an increase of the effective display panel size, i.e., an area on which users will see the image content on the flexible display panel 323.

Figure 3B:
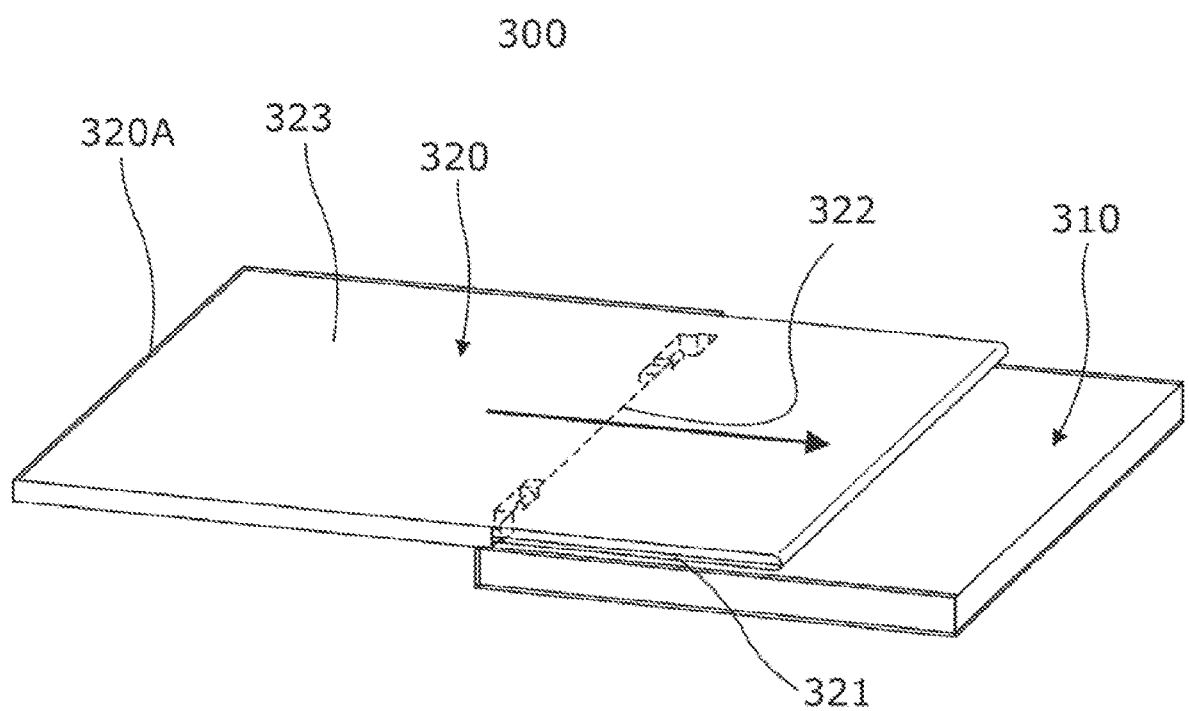
FIG. 3B shows the computing device of FIG. 3A upon a deployment of a platform of the lid portion.

Referring now to FIG. 3B, the computing device 300 having the platform 321 in the deployed position is shown. As a result of the deployment, an area of the flexible display panel 323 on an upper side of the lid portion 320 is to increase such that the area overlaps with the base portion 310.

In the computing device 300, the deployment of the platform 321 results in a decrease of the area of flexible display panel 323 on a lower side of the platform 321. As explained in reference to FIG. 3A, to enable an increase of the effective display panel size based on a position of the platform 321 with respect to the aperture 322, the flexible display panel 323 covers the upper side of the lid portion 320 and a lower side of the platform 321. In FIG. 3B, a first edge of the flexible display panel 123 on the upper side of the lid portion 320 is attached to a top side 320A of the lid portion 320, the flexible display panel 323 and the lower side of the platform 321 overlap in a lower side overlap area, and, upon the deployment of the platform 321, the lower side overlap area is to decrease with respect to the lower side overlap area on the lower side of the platform 321 before the deployment of the platform 321.

In some examples, the deployment of the platform 321 is in response to a trigger event. Such trigger event may be a signal received by a controller of the computing device 300 (for instance, a trigger signal associated with a deployment of the platform 321), a relative position between the lid portion 320 and the base portion 310 (for instance, exceeding a threshold angle between the lid portion 320 and the base portion 310), actuating an actuator member of the computing device (for instance, actuating a deployment member located in the lid portion 320), among others.

According to some examples, the lid portion of the computing device may rotate with respect to the base portion of the computing device in a range from 0 degrees to substantially 360 degrees. In other examples, the lid portion may rotate with respect to the base portion in a range from 0 degrees to substantially 180 degrees. In some examples, the computing device may comprise a locking member to lock a position of the platform with respect to the lid portion based on a relative position between the lid portion and the base portion. For instance, referring to the computing device 300 of FIGS. 3A and 3B, the locking member may unlock the movement of the platform 321 upon the lid portion 320 and the base portion 310 are at an angle equal to or greater than 180 degrees. In this fashion, a contact between the platform 321 and the base portion 310 is prevented. In an example, the movement of the platform 321 may be unlocked by the locking member based on a signal of a sensor of the computing device 300. However, in other examples, the movement of the platform 321 may be unlocked by the locking member based on mechanical elements, such as a self-locking cam to unlock the platform 321 upon the lid portion 320 and the base portion 310 are at an angle greater than 180 degrees.

Figure 4A:
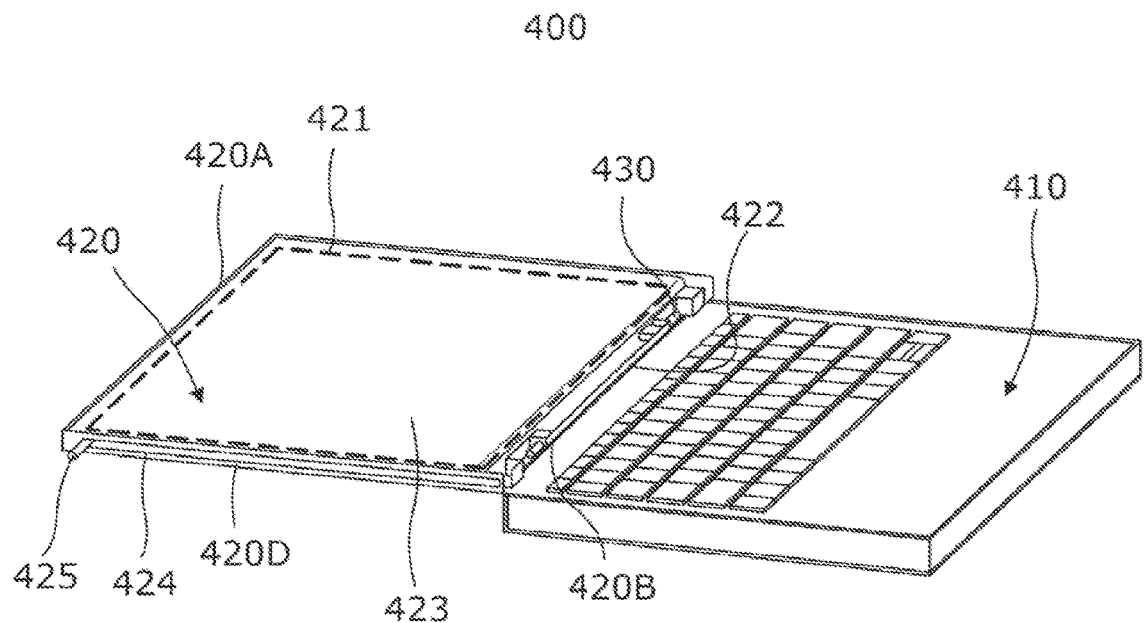
FIG. 4A shows a detailed view of a computing device comprising a protruding element in a first position, according to an example of the present disclosure.

Referring now to FIG. 4A, a computing device 400 comprising a protruding element 425 in a first position is shown. The computing device 400 comprises a lid portion 420 rotatably coupled to a base portion 410 via a hinge 430, where the lid portion 420 comprises a platform 421 (represented in dashed lines), an aperture 422 on a bottom side 420B of the lid portion 420 to receive the platform 421, a flexible display panel 423 to cover an upper side of the lid portion 420 and a lower side of the platform 421, a track 424 along a lateral side 420D of the lid portion 420, and the protruding element 425 on a lateral side of the platform 421. The protruding element 425 protrudes from the lateral side 420D of the lid portion 420 and is movable along the track 424 between a first position and a second position. The first position corresponds to a position in which the platform 421 does not protrude from the lid portion 420. The second position corresponds to a position in which the platform is fully deployed from the lid portion 220. In the computing device 200A, the protruding element 225 is in the first position. In an example, the first position of the protruding element 425 corresponds to the retracted position of the platform 421 and the second position corresponds to the deployed position of the platform 421.

In FIG. 4A, a first end of the flexible display panel 423 located on the upper side of the lid portion 420 is attached to the lid portion 420. In particular, the first end of the flexible display panel 423 is attached to a top side 420A of the lid portion 420. As previously explained in FIGS. 3A and 3B, the flexible display panel 423 also covers the lower side of the platform 421 such that the deployment of the platform 421 results in an increase of the portion of flexible display panel 423 on the upper side of the lid portion 420, i.e., the effective display panel size.

In some examples, a movement of the platform 421 with respect to the lid portion 420 may be locked by a locking member. Thus, although a user aims to deploy the platform 421, the locking member prevents the platform 421 from extending away from the aperture 422. To unlock the movement of the platform 421, the locking member may have to receive an unlocking signal from the controller. In other examples, the locking member may comprise mechanical elements to determine whether or not a current configuration of the computing device 400 (for instance, an angle between the lid portion 420 and the base portion 410) meets the deployment criteria. In an example, the deployment criteria to unlock the movement of the platform 421 may be if an angle between the lid portion 420 and the base portion 410 is within a threshold angle range (for instance, a range from 180 degrees to 270 degrees). Thus, if the lid portion 420 and the base portion 410 are at an angle outside the threshold angle range, the deployment of the platform 421 is locked by the locking member.

Figure 4B:
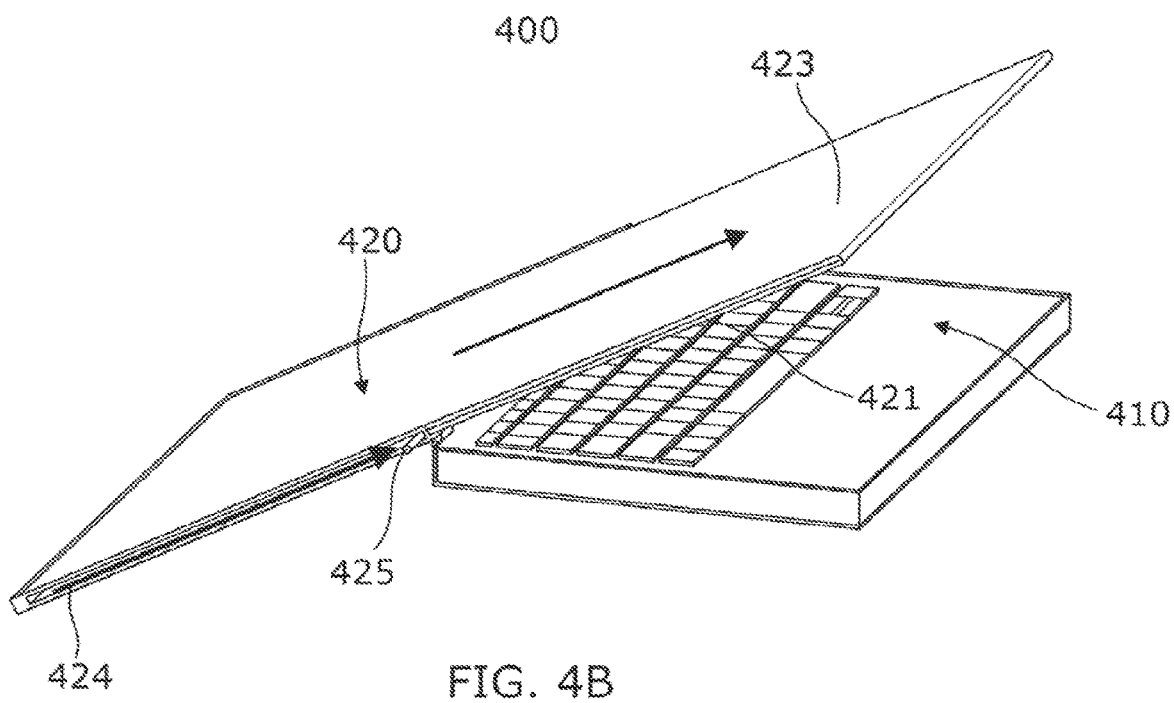
FIG. 4B shows the computing device of FIG. 4A with the protruding element in a second position.

Referring now to FIG. 4B, the computing device 400 is shown when the protruding element 425 is in a second position. In the second position, the platform 421 fully extends from the aperture 422 of the lid portion 420. As indicated by the arrows, the movement of the protruding element 425 from the first position (represented in FIG. 4A) to the second position results in an increase of the effective display panel size.

In FIG. 4B, the lid portion 420 of the computing device 400 is at an angle wider than 180 degrees with respect to the base portion 410. As previously explained, in some examples, the movement of the platform 421 may be locked by a locking member based on a relative angle between the lid portion 420 and the base portion 410. For instance, the movement may be locked if the relative angle is outside a threshold angle range.

Although the computing devices 300, 400 of FIGS. 3A to 4B comprise the aperture 322, 422 on the bottom side 320B, 420B of the lid portion 320, 420, it should be understood that in other examples alternative locations such as a lateral side (as previously explained in reference to FIGS. 2A and 2B) or the top side 320A, 420A may be possible. Based on the location of the aperture 322, 422 of the lid portion 320, 420, the flexible display panel 323, 423 may be fixedly attached to a different location instead of the top side 320A, 420A of the lid portion 320, 420.

Figure 5A:
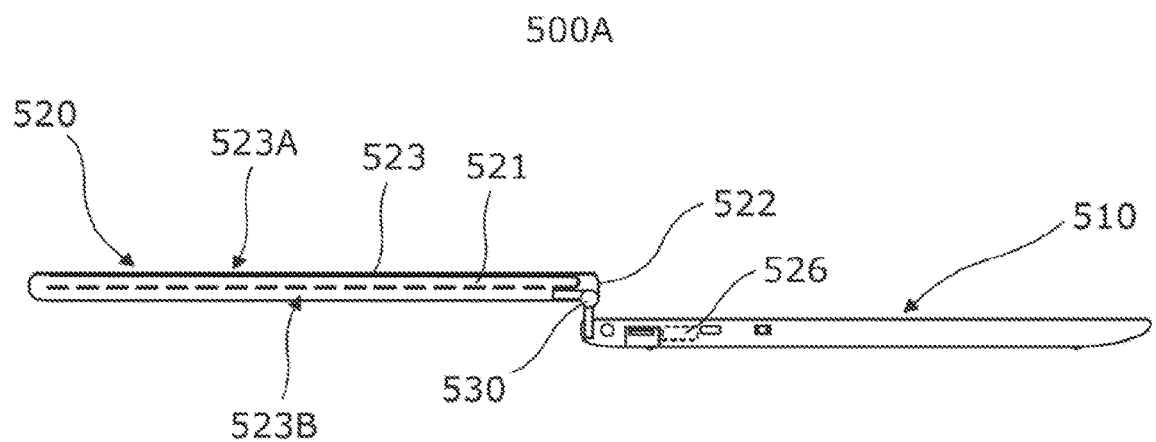
FIG. 5A shows a side view of a computing device comprising a platform in a retracted position, according to an example of the present disclosure.

Referring now to FIG. 5A, a side view of a computing device 500A comprising a platform 521 in a retracted position is shown. The computing device 500A may correspond, for instance, with the computing devices 100, 200, 300 and 400 previously explained in reference to FIGS. 1A to 4B. Thus, the similarly-named elements of example computing devices may be similar in function and/or structure to the respective elements of other example computing devices, as they are described above. In FIG. 5A, the lid portion 520 comprises an aperture 522 to receive the platform 521 and the flexible display panel 523 is disposed on the platform 521, where an upper side area 523A represents an area of the flexible display panel 523 on an upper side of the lid portion 520 and a lower side area 523B represents an area of the flexible display panel 523 on a lower side of the platform 521.

In the computing device 500A, the base portion 510 comprises a sensor 526 to detect a position of the platform 521 with respect to the lid portion 520. Based on the determined position, a deployment state of the platform 521 may be determined. In an example, the sensor 526 may determine a position of the platform 521 with respect to the retracted position. In some examples, the deployment state may be used to determine an image content on the flexible display panel 523. In some other examples, the deployment state of the platform 521 may be associated with an interface region corresponding to the upper side area 523A. In other examples, the interface region may correspond to the lower side area 523B.

In order to rotatably couple the base portion 510 and the lid portion 520, the computing device 500A comprises a hinge assembly 530. In some examples, the hinge assembly 530 comprises a hinge and a locking member to lock a movement of the platform 521 with respect to the lid portion 520. In response to an unlocking signal, the locking member is to unlock the movement of the platform 521. In other examples, the hinge assembly 530 may comprise a hinge, a locking member to lock a movement of the platform with respect to the lid portion 520, and a sensor to determine an angle between the lid portion 520 and the base portion 510. Upon the sensor determines an angle within a threshold angle range, the locking member is to unlock the movement of the platform 521.

Although the sensor 526 of the computing device 500A is in the base portion 510, in other examples, alternative locations may be possible. In an example, the sensor 526 may be in the lid portion 520, where the sensor is to determine a distance from the sensor 526 to the platform 521. Based on the distance, the deployment state of the platform 521 may be determined.

Figure 5B:
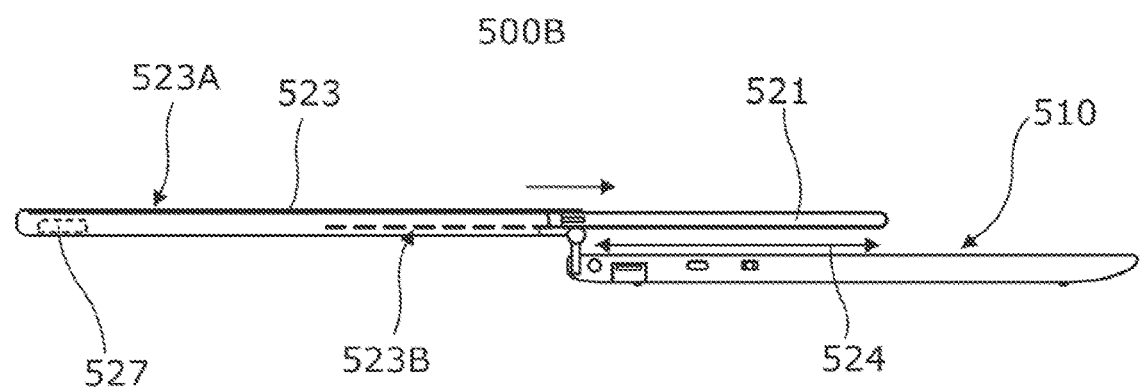
FIG. 5B shows a side view of a computing device comprising a deployment member located in a lid portion, according to an example of the present disclosure.

Referring now to FIG. 5B, a computing device 500B comprising a deployment member 527 in the lid portion 520 is shown. The deployment member 527 is to move the platform 521 between a retracted position and a deployed position. In FIG. 5B, the deployment member 527 has moved the platform 521 such that the platform 521 extends away from the aperture of the lid portion 520. Upon the deployment of the platform 521, the upper side area 523A of the flexible display panel 523 is to increase such that the upper side area 523A overlaps with the base portion 510. In FIG. 5B, an overlap area 524 represents a projection of the upper side area 523A onto the base portion 510. In addition, the deployment of the platform 521 results in a decrease of the lower side area 523B.

In an example, the deployment member 527 is to deploy the platform 521 in response to a trigger event. The trigger event may comprise receiving a trigger signal associated with the deployment of the platform 521, a trigger signal associated with an angular position of the lid portion 520 with respect to the base portion 510, actuating an actuator member located in the lid portion 520, among others. In some examples, the deployment member 527 may position the platform 521 in a set of positions between the retracted position of the platform 521 and the deployed position of the platform 521. In an example, when the computing device 500B corresponds with the computing device 400 of FIGS. 4A and 4B, the deployment member 327 may include a declutch state to enhance the user experience when users are moving the protruding element 425 along the track 424. In the declutch state, the deployment member 427 does not exert forces towards the platform 421.

Figure 5C:
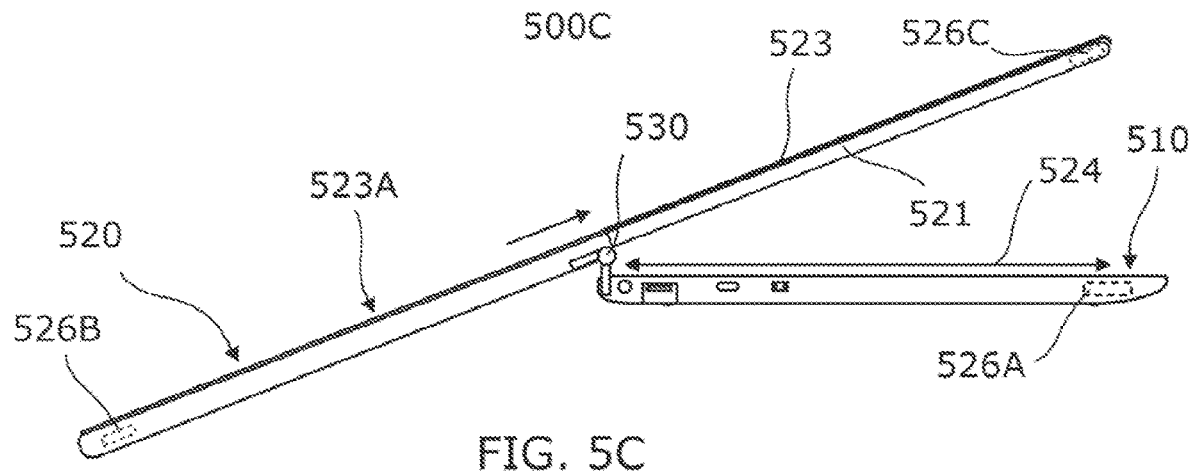
FIG. 5C shows a side view of a computing device comprising a platform in a deployed position, according to an example of the present disclosure.

Referring now to FIG. 5C, a computing device 500C comprising the platform 521 in the deployed position is shown. As previously explained, the deployed position corresponds to a position in which the platform 521 is fully extended from the aperture of the lid portion 520. In the deployed position, a projection of the upper side area 523A onto the base portion 510 results in an overlap area 524. As a result of the deployment, the flexible display panel 523 and a lower side of the platform 521 do not overlap. In other words, the flexible display panel 523 is on the upper side of the lid portion 520. In some examples, in order to tighten the flexible display panel 523, a distal edge of the platform 521 may comprise a torsion element coupled to an end of the flexible display panel 523. As a result, the tensions along the length of the flexible display panel 523 will be maintained even when the relative position between the platform 521 and the lid portion 520 has changed.

The computing device 500C comprises a sensor 526A in the base portion 510 to determine a position of a first reference element 526B and a second reference element 526C. In an example, based on the determined positions for the first reference element 526B and for the second reference element 526C, the sensor 526A may determine the deployment state of the platform 521 and the angle between the lid portion 520 and the base portion 510.

In FIG. 5C, the lid portion 520 is coupled to the base portion 510 via a hinge assembly 530 which enables angles wider than 180 degrees between the lid portion 520 and the base portion 510. As previously explained, the hinge assembly 530 may comprise a locking member to lock a deployment of the platform 521. In some examples, the locking member of the hinge assembly 530 may enable the deployment of the platform 521 upon the sensor 526A determines an angle greater than 180 degrees between the lid portion 520 and the base portion 510. However, in other examples, the hinge assembly 530 may unlock the deployment of the platform 521 upon an upper side of the lid portion 520 is substantially parallel to the upper side of the base portion 510.

Figure 6B:
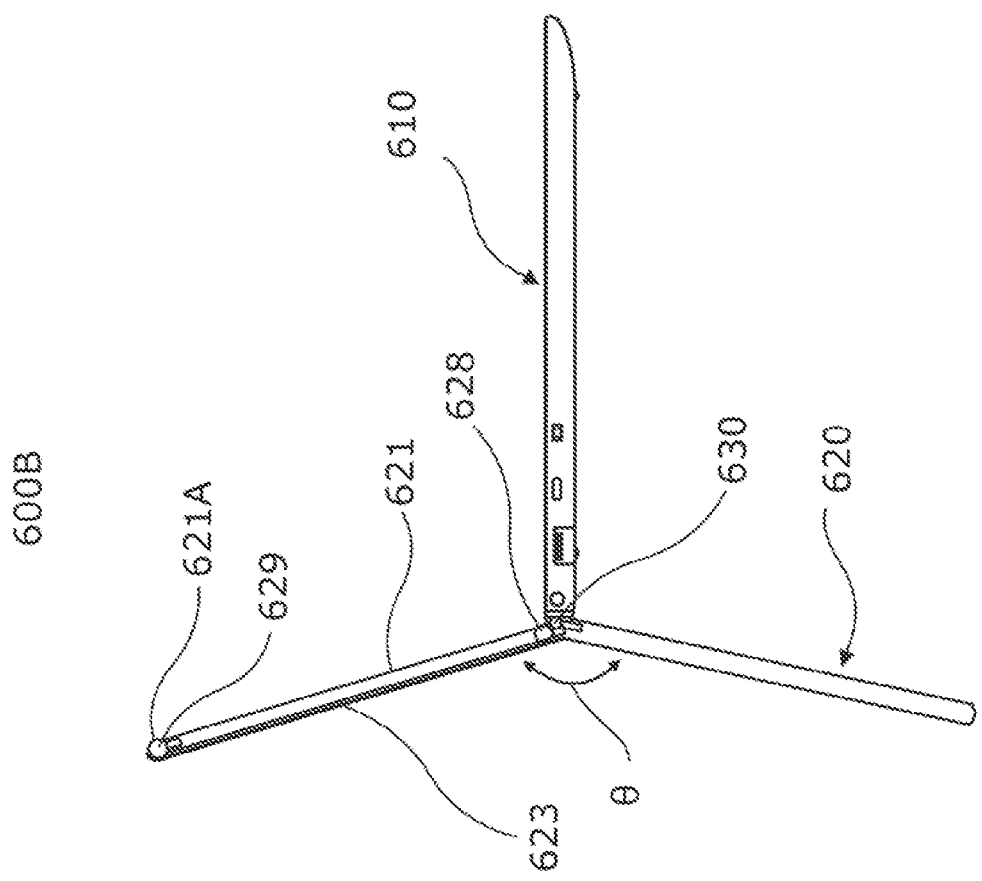
FIG. 6B shows a side view of a computing device having a platform at an angle with respect to a lid portion, according to an example of the present disclosure.
Figure 6A:
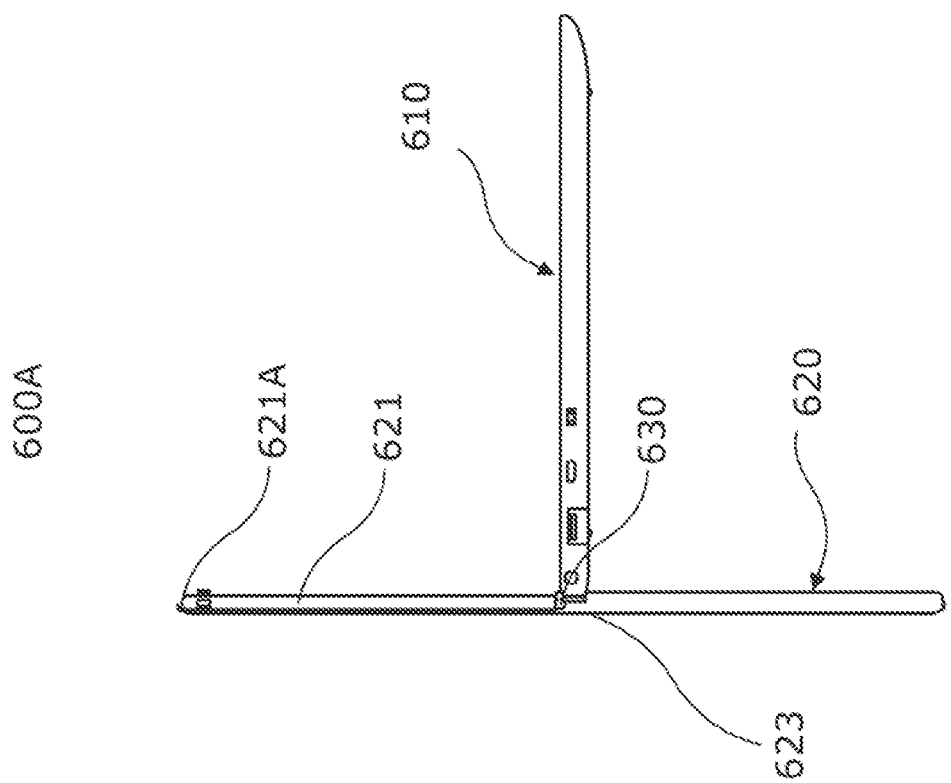
FIG. 6A shows a side view of a computing device comprising a lid portion substantially perpendicular to a base portion, according to an example of the present disclosure.

Referring now to FIG. 6A, a computing device 600A comprising a lid portion 620 substantially perpendicular to a base portion 610 is shown. The lid portion 620 is rotatably coupled to the base portion 610 via a hinge mechanism 630 comprising a locking member and a sensor to determine an angle between an upper side of the lid portion 620 and an upper side of the base portion 610. Upon determining that the angle is within a threshold angle range, the sensor may issue a signal to the locking member. In an example, in response to the signal, the locking member of the hinge assembly 630 unlocks a movement of the platform 621. In other examples, the lid portion 620 may comprise a deployment member and the signal may also trigger the deployment of the platform 621.

In the example of FIG. 6A, an end of the flexible display panel 623 is movably attached to a distal end 621A of the platform 621. However, in other examples, the flexible display panel 623 may be attached at a different location instead of the distal end 621A of the platform 621, such as a lower side of the platform 621. In some examples, the flexible display panel 623 may be attached to the platform 621 via an elastic element to tighten the flexible display panel 623 on the upper side of the lid portion 620.

Referring now to FIG. 6B, a computing device 600B with the platform 621 at an angle θ with respect the lid portion 620 is shown. In the example of FIG. 6B, the platform 621 is in the deployed position. In the deployed position, the platform 621 is rotatable with respect to the lid portion 620 such that a curved display panel configuration is obtained. In order to enable the rotation of the platform 621 with respect to the lid portion 620, the platform 621 comprises a platform hinge 628 on a proximal end of the platform 621. Since the platform hinge 628 is located on the proximal end of the platform 621, the rotation about the hinge 628 is unlocked upon the platform hinge 628 protrudes from the lid portion 620. In an example, the platform hinge 628 protrudes from the lid portion 620 in the deployed position of the platform 621. In some examples, the platform hinge 628 enables angles θ lower than 180 degrees. In some other examples, the angle θ may comprise values within an angle range from 160 degrees to 180 degrees.

The platform 621 of the computing device 600B further comprises a torsion element 629 on the distal end 621A of the platform 621, where the torsion element 629 is to tighten the flexible display panel 623 on the upper side of the lid portion 620. In the example of FIG. 6B, the torsion element 629 is fixedly attached to a second end of the flexible display panel 623. However, in other examples, the torsion element 629 may at a different location such as the lower side of the platform 621 instead of the distal end 621A of the platform 621.

In some examples, an intermediate region of the flexible display panel 623 may be fixedly attached to the lid portion 620 in order prevent the flexible display panel 423 from being loosen when the platform 621 is at the angle θ with respect the lid portion 620.

As previously explained, the deployment of the platform 621 may be enabled based on a relative position between the lid portion 620 and the base portion 610. Similarly, the rotation of the platform 621 with respect to an upper side of the lid portion 620 about the platform hinge 628 may be enabled based on the relative position between the lid portion 620 and the base portion 610. In an example, the hinge assembly 630 comprises a first locking member to lock a deployment of the platform 621 and the platform hinge 628 comprises a second locking member to lock a rotation of the platform 621. Upon the angle between the lid portion 620 and the base portion 610 is to exceed a first threshold angle, a deployment of the platform 621 is unlocked by the first locking member. Then, once the platform 621 is fully deployed, a rotation of the platform 621 about the platform hinge 628 may be enabled by the second locking member. In an example, the rotation of the platform 621 about the platform hinge 628 is unlocked upon lid portion 620 is at an angle greater than a second threshold angle with respect to the base portion 610, the second threshold angle being equal or greater than the first threshold angle.

In an example, instead of preventing the platform 621 from moving and rotating based on the first threshold angle and the second threshold angle, a first threshold angle range for the deployment of the platform 621 and a second threshold angle range for the rotation of the platform 621 may be defined. In an example, the first threshold angle range comprises angles from 180 degrees to 270 degrees and the second threshold angle range comprises angles from 200 degrees to 250 degrees. However, in other examples, the first threshold angle range and the second threshold angle range may be the same, such as a range from 180 degrees to 270 degrees.

In some other examples, the hinge assembly 630 may comprises a sensor to determine an angle between the lid portion 620 and the base portion 610 and a locking member to lock a movement of the platform 621 with respect to the lid portion 620 and a rotation of the platform 621 about the platform hinge 628. Upon the determined angle is within a threshold angle range, the locking member is to unlock the movement of the platform 621. Then, if the determined angle is lower than a locking angle within the threshold angle range, the locking member is to unlock the rotation of the platform 621. In an example, the threshold angle range may be from 180 degrees to 270 degrees and the locking angle may be 250 degrees. Hence, if the determined angle is between 180 degrees and 250 degrees, the movement of the platform 421 and the rotation of the platform 421 about the hinge 427 may be enabled. If the determine angle is between 250 degrees and 270 degrees, the movement of the platform 421 is enabled but the locking member prevents the rotation of the platform 421 about the hinge 427. In other examples, the computing device 600B may comprise one of the sensors 326, 326A previously explained in FIGS. 3A and 3C, where the sensors 326, 326A may determine the relative position between the lid portion 620 and the base portion 610.

Figure 7A:
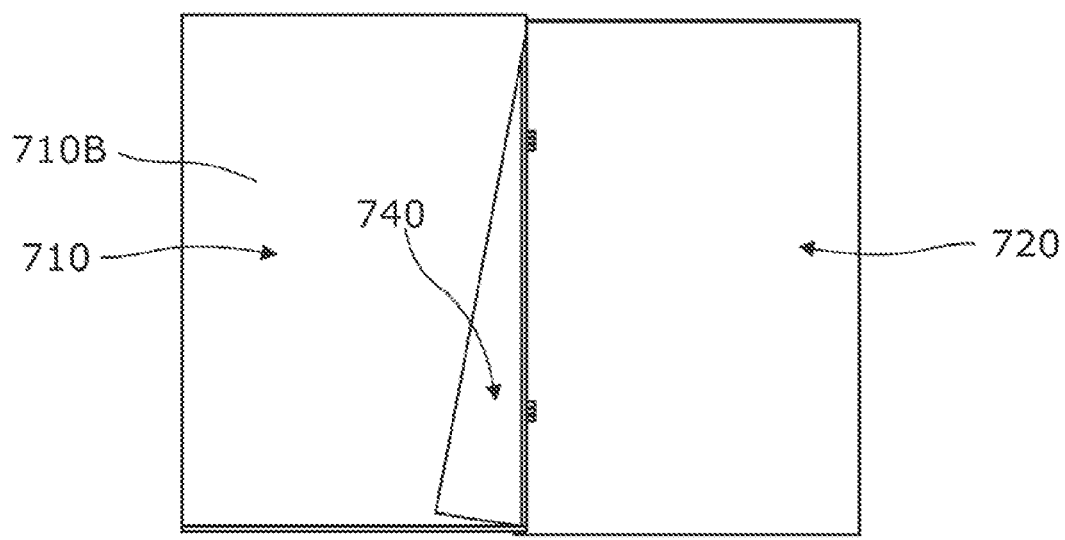
FIG. 7A shows a detailed view of a computing device comprising a stand feature aligned with a surface of the base portion, according to an example of the present disclosure.

Referring now to FIG. 7A, a computing device 700 comprising a stand feature 740 aligned with a surface 710B of the base portion 710 is shown. The computing device 700 may correspond, for instance, with the computing devices 100, 200, 300, 400, 500A, 500B, 500C, 600A, and 600B previously explained in reference to FIGS. 1A to 6B. The stand feature 740 is movable between a retracted position in which the stand feature 740 is aligned with the surface 710B and a deployed position in which the stand feature 740 protrudes from the surface 710B. In FIG. 7A, the stand feature 740 is in the retracted position.

In an example, the computing device 700 may use the stand feature 740 as a stand when the computing device 700 is to be used in a portrait orientation. In some examples, the computing device 700 may further comprise sensors to determine if the computing device 700 is in the portrait orientation, where the sensor is to issue a signal to a controller of the computing device 700 if the computing device 700 is determined to be in the portrait orientation. In response to the signal, the controller may rotate an image content to be displayed on the flexible display panel of the computing device 700.

Figure 7B:
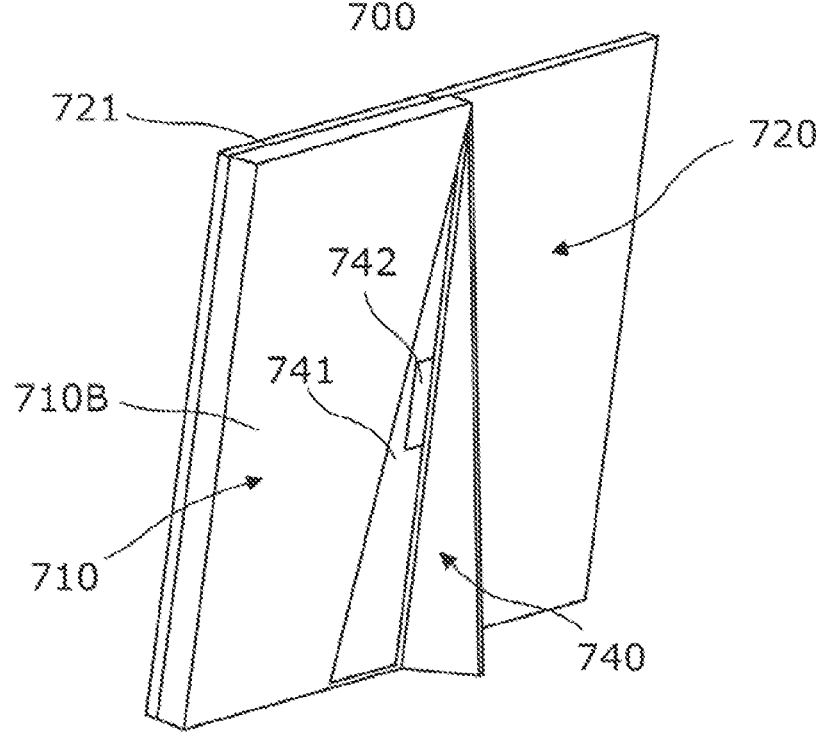
FIG. 7B shows the computing device of FIG. 7A upon the stand feature protrudes from the base portion.

Referring now to FIG. 7B, the computing device 700 having the stand feature 740 in the deployed position is shown. In the deployed position, the stand feature 740 extends away from a recess 741 on the surface 710B, i.e., protrudes from the surface 710B. The computer device 700 further comprises an actuator 742 within the recess 741, wherein the actuator 742 is to move the stand feature 740 between the retracted position (represented in FIG. 7A) in which the stand feature 740 is aligned with the surface 710B and the deployed position (represented in FIG. 7B) in which the stand feature 740 extends from the recess 741 of the surface 710B.

In some examples, the position of the stand feature 740 may be controlled based on a position of a platform 721 of the computing device 700 with respect to the lid portion 720 of the computing device 700. For instance, upon deploying the platform 721, the stand feature 740 may protrude from the surface 710B of the base portion 710. In an example, the position of the stand feature 540 may be controlled based on a stand feature deployment signal issued by the controller of the computing device 700. In response to the stand feature deployment signal, the actuator 742 is to move the stand feature 740 to the deployed position.

Although the stand feature 740 of the computing device 700 of FIGS. 7A and 7B is located on the surface 710B of the lid portion 710, it should be understood that other alternative locations may be possible, such as a stand feature 740 on a lateral side of the base portion 710 or a stand feature 740 on a surface of the lid portion 720 of the computing device 700.

Figure 8:
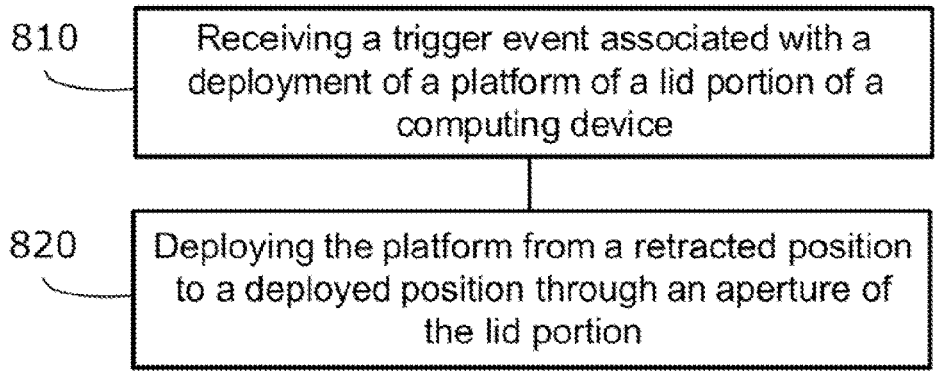
FIG. 8 shows a method for deploying a platform of a lid portion of a computing device, according to an example of the present disclosure.

Referring now to FIG. 8, a method 800 for deploying a platform of a lid portion of a computing device is shown. The computing device may correspond with any of with the computing devices 100, 200, 300, 400, 500A, 500B, 500C, 600A, 600B, and 700 previously explained in reference to FIGS. 1A to 7B. At block 810, method 800 comprises receiving a trigger event associated with a deployment of a platform of a lid portion of a computing device. As previously explained, the platform is covered by a flexible display panel disposed in the lid portion. At block 820, method 800 comprises in response to the trigger event, deploying the platform from a retracted position to a deployed position through an aperture of the lid portion. In the deployed position, the platform extends away from an aperture of the lid portion. In an example, a first end of the flexible display panel of the computing device is attached to the lid portion and an interface region between the flexible display panel and an upper side of the lid portion is defined. As a result of the deployment (block 820), the interface region is greater with respect to the interface region before the deployment (in other words, the interface region is greater in the deployed position than in the retracted position).

In some examples, when the computing device comprises a stand feature, method 800 may further comprise moving the stand feature to a deployed position in response to the trigger event. In order to deploy the stand feature, the computing device may comprise an actuator (for instance, the actuator 742 previously explained in FIG. 7B).

In some other examples, method 800 may further comprise determining a deployment state of the platform with a sensor and displaying an image content on the flexible display panel based on the deployment state.

Figure 9:
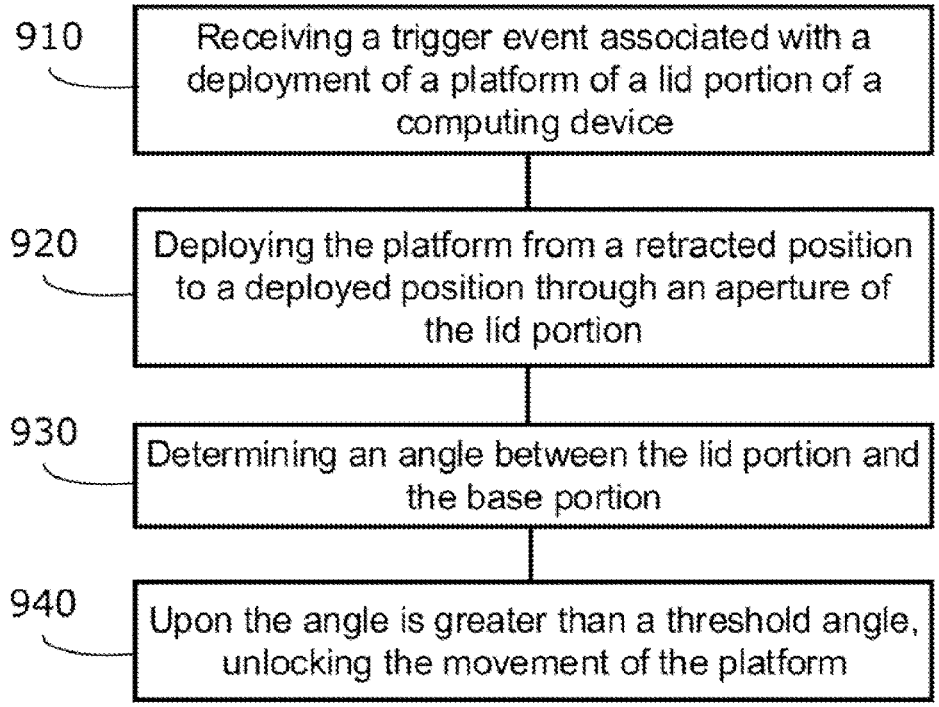
FIG. 9 shows a method for unlocking a movement of a platform of a computing device upon an angle between the lid portion and the base portion is greater than a threshold angle, according to an example of the present disclosure.

Referring now to FIG. 9, a method 900 for unlocking a movement of a platform of a computing device upon an angle between the lid portion and the base portion is greater than a threshold angle is shown. At block, method 900 comprises receiving a trigger event associated with a deployment of a platform of a lid portion of a computing device. At block 920, method 900 comprises deploying the platform from a retracted position to a deployed position through an aperture of the lid portion in response to the trigger event. Then, at block 930, method 900 comprises determining an angle between the lid portion and the base portion. As previously explained, the computing device may comprise a sensor to determine a relative position between the lid portion and the base portion. At block 940, method 900 comprises unlocking the movement of the platform upon the angle is greater than a threshold angle. In order to lock the movement of the platform, the computing device may comprise a locking member to lock the movement of the platform with respect to the aperture of the lid portion. In an example, method 900 may further comprise deploying a stand feature in response to a trigger event.

In some examples, an end of the platform of the computing device comprises a hinge and a locking member to lock a rotation of the platform with respect to the lid portion and method 900 may further comprise unlocking the rotation about the hinge upon the angle between the lid portion and the base portion is greater than a second threshold angle.

As explained above, examples of trigger events to trigger a deployment of a platform comprise receiving a trigger signal associated with a deployment of the platform, exceeding a threshold angle between the lid portion and the base portion, and actuating an actuator member located in the lid portion of the computing device.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A computing device comprising:
a base portion; and
a lid portion rotatably coupled to the base portion, the lid portion comprising:
a platform;
an aperture to receive the platform; and
a flexible display panel disposed on the platform,
wherein upon a deployment of the platform, an area of the flexible display panel on an upper side of the lid portion is to increase such that the area overlaps with the base portion.

2. The computing device of claim 1, wherein:
a first edge of the flexible display panel is fixedly attached to a first end on the upper side of the lid portion,
the flexible display panel and a lower side of the platform overlap in an overlap area, and
upon the deployment of the platform, the overlap area is to decrease with respect to the overlap area before the deployment of the platform.

3. The computing device of claim 1, wherein the lid portion includes a locking member to lock a position of the platform with respect to the lid portion, and
in response to a trigger event, the locking member is to enable the deployment of the platform.

4. The computing device of claim 1, further comprising a stand feature aligned with a surface of the base portion, wherein upon the deployment of the platform, the stand feature is to protrude from the surface of the base portion.

5. The computing device of claim 4, wherein:
the lid portion further comprises a deployment member to move the platform to a deployed position, and
in response to a trigger event, the deployment member is to move the platform to the deployed position.

6. The computing device of claim 4, wherein the lid portion further comprises a sensor to determine a relative position between the upper side of the lid portion and an upper side of the base portion, wherein the sensor is to issue a trigger event upon the upper side of the lid portion is substantially parallel to the upper side of the base portion.

7. A method comprising:
  receiving a trigger event associated with a deployment of a platform of a lid portion of a computing device rotatably coupled to a base portion of the computing device, the platform being covered by a flexible display panel disposed in the lid portion; and
  in response to the trigger event, deploying the platform from a retracted position to a deployed position through an aperture of the lid portion,
  wherein a first end of the flexible display panel is attached to the lid portion, wherein an interface region between the flexible display panel and an upper side of the lid portion is greater in the deployed position than in the retracted position.

8. The method of claim 7, further comprising:
  determining a deployment state of the platform associated with the interface region; and
  displaying an image content on the flexible display panel based on the deployment state of the platform.

9. The method of claim 7, wherein the lid portion further comprises a locking member to lock a movement of the platform with respect to the aperture, the method further comprising:
  determining an angle between the lid portion and the base portion; and
  upon the angle is greater than a threshold angle, unlocking the movement of the platform.

10. The method of claim 9, wherein the trigger event comprises:
  receiving a trigger signal associated with a deployment of the platform;
  exceeding the threshold angle; and
  actuating an actuator member located in the lid portion.

11. A computing device comprising:
  a base portion;
  a lid portion rotatably coupled to the base portion, the lid portion comprising:
    a platform;
    an aperture to receive the platform;
    a flexible display panel to cover an upper side of the lid portion and a lower side of the platform, wherein a first end of the flexible display panel on the upper side is attached to the lid portion;
    a track along a lateral side of the lid portion; and
    a protruding element on a lateral side of the platform;
    wherein the protruding element is movable along the track between a first position and a second position, wherein upon a movement of the protruding element from the first position towards the second position, the flexible display panel is to extend away from the aperture.

12. The computing device of claim 11, wherein an end of the platform comprises a hinge, wherein upon the protruding element is in the second position, the platform is to rotate about the hinge with respect to the lid portion.

13. The computing device of claim 12, wherein the platform comprises a torsion element fixedly attached to a second end of the flexible display panel such that the torsion element is to tighten the flexible display panel on the upper side of the lid portion.

14. The computing device of claim 11, wherein the lid portion is rotatably coupled to the base portion via a hinge assembly, the hinge assembly comprising:
  a sensor to determine an angle between the lid portion and the base portion, and
  a locking member to lock a movement of the platform with respect to the lid portion,
  wherein upon the angle is within a threshold angle range, the locking member is to unlock the movement of the platform.

15. The computing device of claim 14, wherein the locking member is further to lock a rotation of the lid portion with respect to the base portion, wherein if the angle is lower than a locking angle within the threshold angle range, the locking member is to unlock the rotation.

* * * * *